United States Patent [19]

Barlow et al.

[11] Patent Number: 5,210,867
[45] Date of Patent: May 11, 1993

[54] METHOD AND APPARATUS FOR MEMORY RETRY

[75] Inventors: George J. Barlow; Raymond D. Bowden, III, both of Tewksbury, Mass.; Michelle A. Pence, Nashua, N.H.

[73] Assignee: Bull HN Information Systems Inc., Billerica, Mass.

[21] Appl. No.: 593,182

[22] Filed: Oct. 5, 1990

[51] Int. Cl.[5] .............................................. G06F 11/14
[52] U.S. Cl. ...................................... 395/575; 371/13; 364/267.3
[58] Field of Search ....................... 371/12, 13, 32, 33; 364/267.3, 285.2; 395/575

[56] References Cited

U.S. PATENT DOCUMENTS

| 4,348,722 | 9/1982 | Gunter et al. | 364/200 |
|---|---|---|---|
| 4,543,628 | 9/1985 | Pomfret | 364/200 |
| 4,644,497 | 2/1987 | Tajima et al. | 364/900 |
| 4,837,767 | 6/1989 | Hartwell et al. | 371/13 |
| 4,896,261 | 1/1990 | Nolan | 364/200 |

Primary Examiner—Charles E. Atkinson
Attorney, Agent, or Firm—Gary D. Clapp; John S. Solakian

[57] ABSTRACT

Memory retry logic to improve the resilience of system memory operations with respect to system errors or faults which prevent a memory read operation from being completed on a first attempt by allowing the memory to retry the operation once. The memory retry logic detects the occurrence of an improper response from the system element requesting a memory read operation when attempting to initiate the system bus operation for reading the data from memory to the requesting element and, if an improper response indicating that the requesting element is not accepting the bus operation request is detected, stores the memory operation request and the requested data and retries the data transmission on the next available bus cycle. If the memory receives an improper response of a specified type during a bus operation of a memory burst, the memory will terminate the operation and proceed to the next requested operation.

9 Claims, 3 Drawing Sheets

METHOD AND APPARATUS FOR MEMORY RETRY

CROSS REFERENCES TO RELATED PATENT APPLICATIONS

The following patent applications and patents which are assigned to the same assignee as the present patent application have related subject matter:

1. Data Processing System Having a Bus Command Generated by One Subsystem on Behalf of Another Subsystem, invented by George J. Barlow, Arthur Peters, Richard C. Zelley, Elmer W. Carroll, Chester M. Nibby, Jr., and James W. Keeley, Ser. No. 944,052 filed Dec. 18, 1986, now abandoned.

2. Apparatus and Method of Loading A Control Store Memory of a Central Subsystem, invented by Richard C. Zelley, Mark J. Kenna, Jr., and Wallace A. Martland, Ser. No. 943,980, filed Dec. 18, 1986 and issued Apr. 3, 1990 as U.S. Pat. No. 4,914,576.

3. Apparatus and Method for Loading and Verifying A Control Store Memory of a Central Subsystem, invented by Chester M. Nibby, Jr., Richard C. Zelley, Kenneth E. Bruce, George J. Barlow, and James W. Keeley, Ser. No. 943,984, filed Dec. 18, 1986 and issued Mar. 20, 1990 as U.S. Pat. No. 4,910,666.

4. Apparatus and Method of Loading Different Control Stores of a Multiprocessor to Provide a Multi-Personality System, Invented by Richard C. Zelley, Mark J. Kenna, Jr., and Wallace A. Martland, Ser. No. 943,985, filed Dec. 18, 1986.

5. Universal Peripheral Controller Self-Configuring Bootloadable Ramware, invented by John A. Klashka, Sidney L. Kaufman, Krzysztof A. Kowal, Richard P. Lewis, Susan L. Raisbeck and John L. McNamara, Jr., Ser. No. 925,431, filed Oct. 31, 1986 and issued Feb. 7, 1989 as U.S. Pat. No. 4,803,623.

6. System Management Apparatus for a Multiprocessor System, invented by George J. Barlow, Elmer W. Carroll, James W. Kelley, Wallace A. Martland, Victor M. Morganti, Arthur Peters and Richard C. Zelley, Ser. No. 869,164, filed May 30, 1986 and continued as Ser. No. 377,785, filed Jul. 6, 1989.

7. Memory System With Automatic Memory Reconfiguration, invented by Robert B. Johnson, Chester M. Nibby, Jr., and Edward R. Salas, Ser. No. 413,631, filed Sept. 3, 1982 and issued Mar. 26, 1985 as U.S. Pat. No. 4,507,730.

8. Memory Controllers With Burst Mode Capability, invented by Robert B. Johnson and Chester M. Nibby, Jr., Ser. No. 202,819, filed Oct. 31, 1980 and issued Dec. 28, 1982 as U.S. Pat. No. 4,366,539.

9. Resilient Bus System, invented by George J. Barlow and James W. Keeley, Ser. No. 717,201, filed Mar. 28, 1985 and issued Aug. 16, 1988 as U.S. Pat. No. 4,764,862.

10. Multiprocessor Shared Pipeline Cache Memory With Split Cycle and Concurrent Utilization, invented by James W. Keeley and Thomas F. Joyce, Ser. No. 655,473, filed Sep. 27, 1984 and issued Sep. 22, 1987 as U.S. Pat. No. 4,695,943.

11. Method and Apparatus for Performing Health Tests Of Units Of A Data Processing System, invented by George J. Barlow, Richard C. Zelley, and James W. Keeley, Ser. No. 07/593,408, filed Oct. 5, 1990.

12. Method and Apparatus For Integrity Testing Of Fault Monitoring Logic, invented by David Cushing, Edward Hutchins, Elmer W. Carroll, and James Bertone, Ser. No. 07/593,179, filed Oct. 5, 1990.

13. Method and Apparatus For Resetting A Memory Upon Power Recovery, invented by Raymond D. Bowden III, Michelle A. Pence, George J. Barlow, Mark E. Sanfacon and Jeffrey S. Somers, Ser. No. 07/593,917, filed Oct. 5, 1990.

BACKGROUND OF THE INVENTION

1. Field of Use

The present invention relates to methods and apparatus for improving the resiliency of a data processing system to system errors or faults and, in particular, to a method and apparatus to allow a memory to retry a transmission of requested data upon receipt of an improper bus transfer operation response upon attempting to initiate a data read.

2. Prior Art

A recurring problem in data processing systems is that of providing the system with the capability, resiliency, to optimize the operation of the system upon the occurrence of system errors or faults. Such faults are well know and frequent and, while an error or fault may be of a temporary or non-fatal nature, often cause substantial disruption to the system operations. The problem, therefore, is to provide the system with a means for responding to such errors or faults in such a manner as to allow the system to continue operation in as normal a manner as possible, without, however, allowing an attempt to continue system operations to lead the system into further faults, for example, allowing the system to become trapped in attempting to repeat and complete an operation that, because of a fault, cannot be completed.

This problem is particularly acute in the case of memory operations because the memory is most probably the busiest element in the system, being the source and receptacle of all data and programs. Therefore, while it is know to allow other system elements to repeat an attempted operation if the operation has failed on a first attempt, this is not done in memory operations due to the risk of tying up memory or delaying access to memory to other elements of the system. For example, a central processing element may make a request to memory for data and the memory will attempt to provide the data to the central processor, but often will discover that the central processor cannot accept the data. The central processor's inability to accept the data transfer from memory is often of a temporary nature, for example, it is handing an interrupt for a higher priority operation, or may be of a more serious nature.

The usual response in such cases is that the memory will cancel the memory request and proceed to service other requests. It is then necessary for the system element requesting the data from memory to re-submit the data request at some later time. While this approach is common in the prior art, and optimizes the probability that any given element in the system will be able to gain access to the memory, it may result in greater loss of system operation in that the operations requiring the data must halt until the data can again be requested.

OBJECTS OF THE INVENTION

It is therefore an object of the present invention to provide an improved method and apparatus for giving a memory improved resiliency in handling errors and faults in the system operation.

It is a further object of the present invention to provide a memory with improved resiliency to system errors and faults by providing a means and method by which the memory may retry a data transmission if an improper response is received in first attempting the data transmission.

SUMMARY OF THE INVENTION

The present invention provides improved resilience for memory operations, in particular memory read operations, wherein the memory receives an improper or illegal response from the element requesting the memory operation. The present invention allows the memory to retry the transmission of the requested data to the requesting element at the next available bus cycle, rather than cancelling the requested read operation and requiring the requesting element to re-submit the request. Certain proper responses asserted by the requesting element during a burst transmission will, however, result in termination of the burst operation.

BRIEF DESCRIPTION OF THE DRAWINGS

The foregoing and other objects, features and advantages of the present invention will be apparent from the following description of the invention and embodiments thereof, as illustrated in the accompanying figures, wherein.

DESCRIPTION OF A PREFERRED EMBODIMENT

Figure 1:
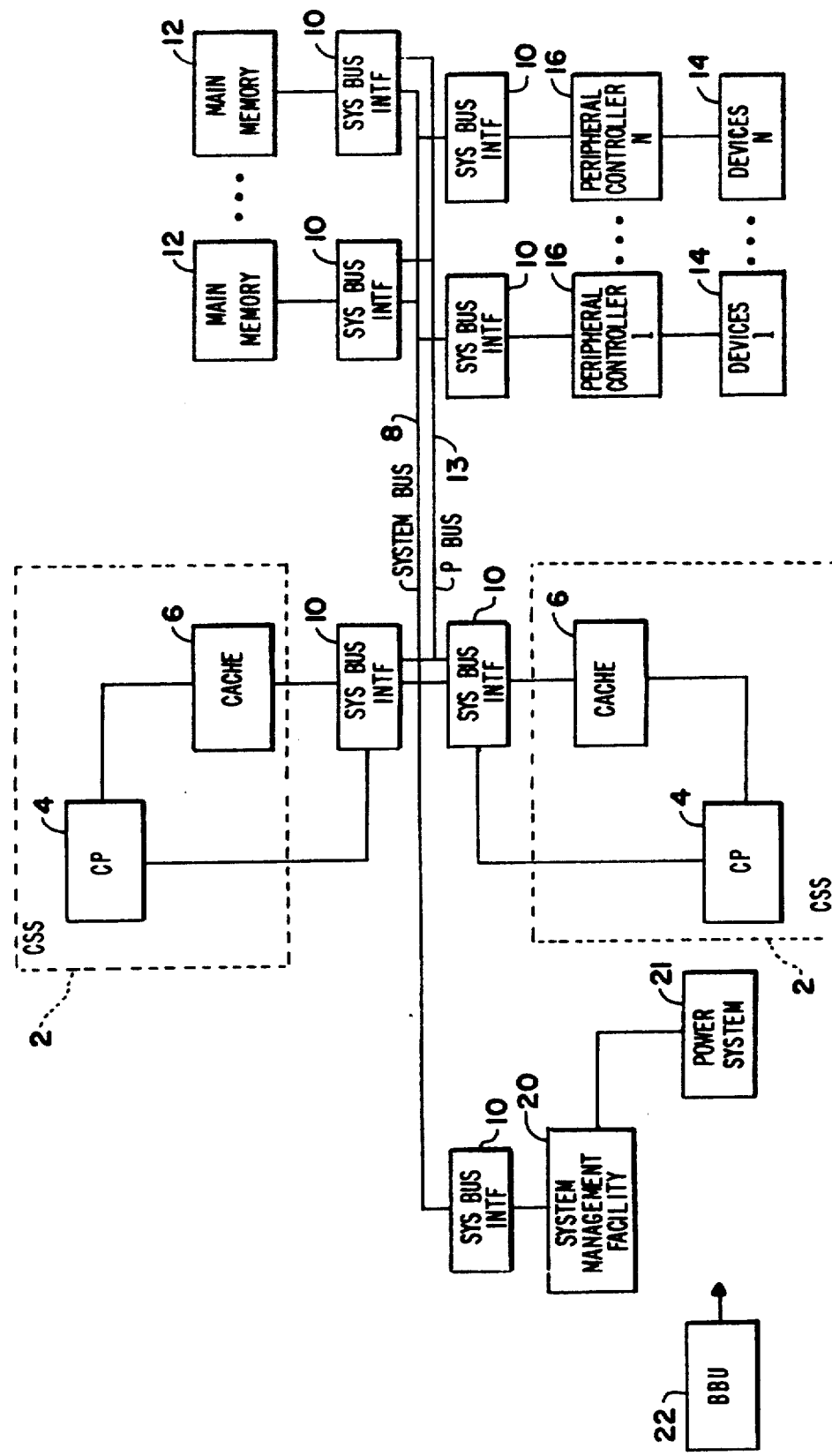
FIG. 1 is a block diagram of an exemplary system incorporating the present invention.

Referring to FIG. 1, therein is represented a block diagram of an exemplary system in which the present invention may be embodied. Data Processing System (DPS) 1 may be, for example, a DPS 6000, Model 600 computer system from Bull HN Information Systems Inc. of Billerica, Mass. The following will describe the structure and operation of DPS 1 only briefly as such systems are generally well known and understood in the art and the exemplary system described specifically herein is described in detail in the previously referenced related patents.

As shown, multiprocessor DPS 1 includes one or more functional units, including one or more Central Sub-Systems (CSSs) 2, each CSS 2 having an independently operating Central Processor (CP) 4 with access to a Cache 6. Each CP 4 and the Cache 6 of each CSS 2 have access to a System Bus (SYSBUS) 8 through a System Bus Interface (SBI) 10.

DPS 1's functional units include one or more Main Memories 12, which are shared by the CSSs 2 and which are each connected to System Bus 8 through a SBI 10. In addition to SYSBUS 8, DPS 1 includes a Private Bus (PBUS) 13 which is connected between each of Main Memories 1 and each of the CSSs 2 with the Main Memories 12 and the CSSs 2 being connected to PBUS 13 through SBIs 10. PBUS 13 is provided as a means for private, high speed data reads from Main Memories 12 to CSSs 2, while general purpose data transfers and memory write operations are performed through SYSBUS 8.

DPS 1 also includes Peripheral Devices (PDs) 14, such as disk and tape drives and communications devices. Each PD 14 is connected to System Bus 8 through a SBI 10 and a appropriate corresponding Peripheral Device Controller (PDC) 16.

DPS 1's functional units also include a System Management Facility (SMF) 20 providing centralized control of initialization of the DPS 1 system, initialization and control of Quality Logic Testing, that is, system fault testing and detection, and loading of operating system programs into Main Memories 12 and CPUs 2. SMF 20 also controls certain overall system operations, including system timing, monitoring of errors and faults, and monitoring of system operating temperature and system power.

Finally, DSP 1 includes a Power System 21 for providing power to all elements of the system and a Battery Backup Unit (BBU) 22 which, as is well known in the art, provides power to certain of DSP 1's circuitry for a limited period in the event of a power interruption from Power System 21. In particular, BBU 22 is intended to provide power to certain elements of Main Memory 12 to maintain the information stored in memory in an intact state until power is restored, thereby avoiding loss of data and system state and the consequent need to reinitialize DSP 1.

Figure 2:
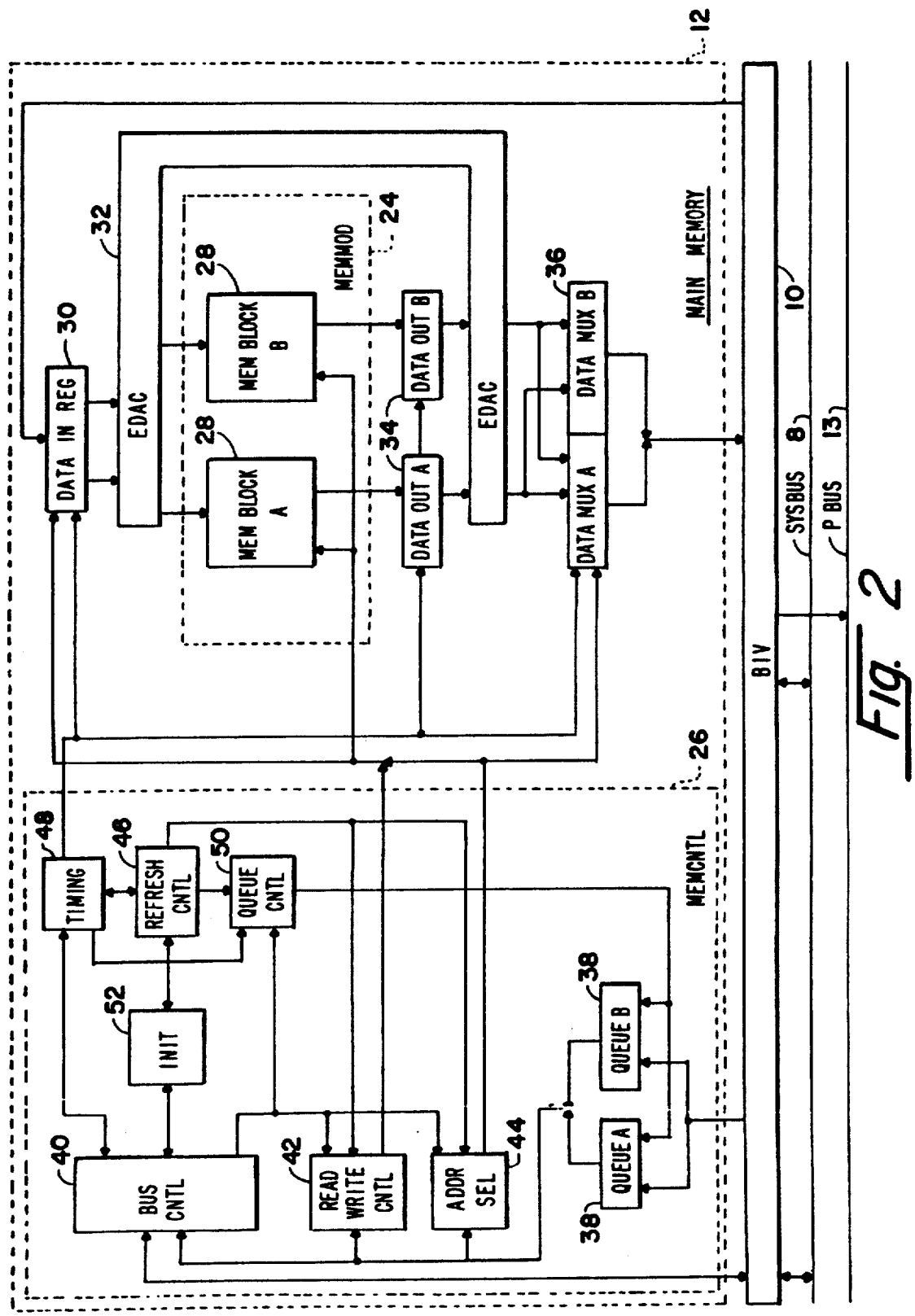
FIG. 2 is a block diagram of a memory of the exemplary system which incorporates the present invention; and, FIG. 3 is a block diagram of exemplary memory logic implementing the present invention.

Referring to FIG. 2, therein is represented an exemplary block diagram of a Main Memory 12 incorporating the present invention. The general structure and operation of a memory such as a Main Memory 12 is well known to those of ordinary skill in the art and is well described in, for example, the previously referenced U.S. Pat. No. 4,507,730 for a Memory System With Automatic Memory Reconfiguration and U.S. Pat. No. 4,366,539 for Memory Controllers With Burst Mode Capability. As such, the following will begin with a general, block diagram description of a Main Memory 12 and will contain detailed descriptions only in the specific area of the present invention.

As shown, Main Memory 12 is comprised of one or more Memory Modules (MEMMOD) 24 containing the actual data storage elements, that is, the memory elements, of the Main Memory 12, and a Memory Controller (MEMCNTL) 26, which contains the logic controlling the operations of the MEMMODs 24.

First considering MEMMOD 24, each MEMMOD 24 of a Main Memory 12 is in turn comprised of one or more blocks of memory elements, such as Memory Blocks (MEMBLOCKs) A and B 28. MEMBLOCKS 28 are customarily organized as rows and columns of addressable memory storage locations. MEMBLOCK A 28 and MEMBLOCK B 28 are further organized as contiguous blocks of addressable memory space, with MEMBLOCK A 28 containing the lower half of the address locations in MEMMOD 24 and MEMBLOCK B 28 containing the upper half of the address locations.

In a present implementation of a MEMMOD 24, using one megabyte DRAMS, MEMMOD 24 is organized as an array of 44 rows by one megabyte columns to store up to 1 megabyte of 44 bit words, wherein each word is comprised of stores a 32 bit double word of data and 12 bits of error detection and correction information. In future implementations, using, for example, 4 megabyte DRAMS, MEMMOD 24 will be organized as a 44 bit by 4 megabyte array.

Data to be written into Main Memory 12 is received from SYSBUS 8 through Bus Interface Unit (BIU) 10, which is primarily comprised of line drivers and receivers, and provided to the inputs of a Data In Register (DATAINREG) 30. The data is buffered in DATAINREG 30 and in turn provided from the outputs of DATAINREG 30 as inputs to Error Detection And Correction (EDAC) block 32. As is well understood in the art, EDAC 32 examines the 32 data bits in each input data word and provides as an output both the original 32 bit data word and a further 12 bits of error correcting code, the 32 data bits and the 12 EDAC bits together comprising the 44 bit word that is written into MEMBLOCKs 28.

The 44 bit words from EDAC 32 are provided to the data inputs of MEMBLOCKs A and B 28 and are written into MEMMOD 24 under the control of row and column addresses and a write/read command provided to MEMBLOCKs 28 by MEMCNTL 26, as is well understood in the art.

Data to be read from MEMMOD 24 is read from MEMBLOCKs 28 under control, again, of row and column addresses and a read/write command provided from MEMCNTL 26 and into Data Output buffer registers DATAOUT A 34 and DATAOUT B 34. DATAOUT A 34 and DATAOUT B 34 are connected from, respectively, the data output lines of MEMBLOCK A 28 and MEMBLOCK B 28. The data stored in DATAOUT A and B 34 is provided as inputs to Error Detection And Correction (EDAC) block 32 which, as again is well understood in the art, uses the 12 bits of error detection and correction information in each 44 bit word to detect and, if possible, correct any errors detected in the 32 data bits.

The corrected data from EDACs 34 is passed to Data Output Multiplexers (DATAMUX) A and B 36, whose outputs are in turn connected through BIU 10 to SYSBUS 8 and PBUS 13. As is well known in the art, the data read from MEMBLOCKs A and B 28 are not necessarily aligned with the appropriate data lines of SYSBUS 8 and PBUS 13, and DATAMUXs A and B 36 are used to align the data words read from MEMMOD 24 with the data lines of SYSBUS 8 and PBUS 13.

Referring now to MEMCNTL 26, requests for memory operations are received from SYSBUS 8 through BIU 10 and into a two deep request QUEUE 38 comprised of a register QUEUE A 38 and a register QUEUE B 38. With the exception of a few types of memory opetations, requests for memory operations are generally received into and read from QUEUE A 38 and QUEUE B 38 alternately, so that one request is being executed from one of QUEUE A and B 38 while a new request is being received into the other of QUEUE A and B 38. One exception, for example, is a request for data to be read from a Main Memory 12 to a CSS 2 through PBUS 13 which, as previously described, is provided for private, high speed reads of data from the memory to the system cental processors, usually as bursts of several words and, in the exemplary system, of 8 32-bit words. In this case, QUEUE 38 is locked to prevent the Main Memory 12 from receiving any further PBUS 13 requests until the PBUS 13 operation is completed, but will accept any other legal requests. In general, however, MEMCNTL 26 may hold, at any time, up to two requests for memory operations of any type.

The memory operation control inputs to QUEUE A 38 and QUEUE B 38 are comprised of an address field, designating the address in Main Memory 12 that data is to be written into or read from, a field of control bits carrying information and commands controlling what memory operations are to be performed and the state of memory operations, and a set of bus handshake and timing lines for controlling the operations of Main Memory 12 with respect to SYSBUS 8. The inputs and outputs of Main Memory 12, including the previously discussed inputs and outputs of MEMMOD 24, are described in further detail in Appendix A, titled Memory Subsystem Interface Lines, and are described further in the previously referenced U.S. Pat. No. 4,507,730 for a Memory System With Automatic Memory Reconfiguration and U.S. Pat. No. 4,366,539 for Memory Controllers With Burst Mode Capability and will not be discussed in further detail herein.

As shown, the memory request command information from QUEUE 38 are provided as inputs to the other elements of MEMCNTL 26, most particularly to Bus Control Logic (BUS CNTL) 40, Read/Write Control (READ/WRITE CNTL) 42, and Address Selection Logic (ADDRSEL) 44.

BUS CNTL 40 is implemented as a state machine which contains logic which receives memory and bus operation control bits from QUEUE 38, from other elements of MEMCNTL 26, and bus control signals, as listed in Appendix A, from SYSBUS 8 and provides, in turn, detailed control signals for controlling the operations of the elements of Main Memory 12 and certain of the bus command and handshake signals to the control lines of SYSBUS 8. The general structure and operation of a BUS CNTL 40 is well known in the art and is described in U.S Pat. No. 4,507,730 for a Memory System With Automatic Memory Reconfiguration and U.S. Pat. No. 4,366,539 for Memory Controllers With Burst Mode Capability.

READ/WRITE CNTL 42 receives the read/write command bit from QUEUE 38 and in turn generates read and write commands to MEMBLOCKs 28 as necessary to execute the requested operations.

ADDRSEL 44, in a similar manner, receives the read/write address bits of each memory request and generates the appropriate row and column addresses to the memory elements of MEMBLOCKs 28. It should be noted that MEMBLOCKs 28 are usually comprised of Dynamic Random Access Memory elements (DRAMs) and, as such, require periodic refreshing to protect the data stored therein from erosion. As is well known, such refresh is usually performed by periodically reading each of the memory elements of MEMBLOCKs 28, the refresh readings of MEMBLOCKs 28 being performed in the intervals between requested memory reads and writes.

Refresh of MEMBLOCKs 28 is performed under control of Refresh Control (REFRESH CNTL) 46, which contains a counter for generating successive row addresses for MEMBLOCKs 28. The refresh row addresses are provided from REFRESH CNTL 46 to ADDR SEL 44, and provided in turn from ADDR SEL 44 to the row address inputs of MEMBLOCKs 28, so that the memory elements of MEMMOD 24 are refreshed a row at a time.

MEMCNTL 26 further includes a TIMING block 48, which is responsive to the system clock to generate timing control signals and clocks to the elements of Main Memory 12, a Queue Control (QUEUE CNTL) 50, which is responsive to the operations of Main Memory 12 to generated control signals to QUEUE 38, and Initialization Logic (INIT) 52, which contains circuitry for initializing the state of Main Memory 12's individual elements at system power-on and after power interrupts.

Figure 3:
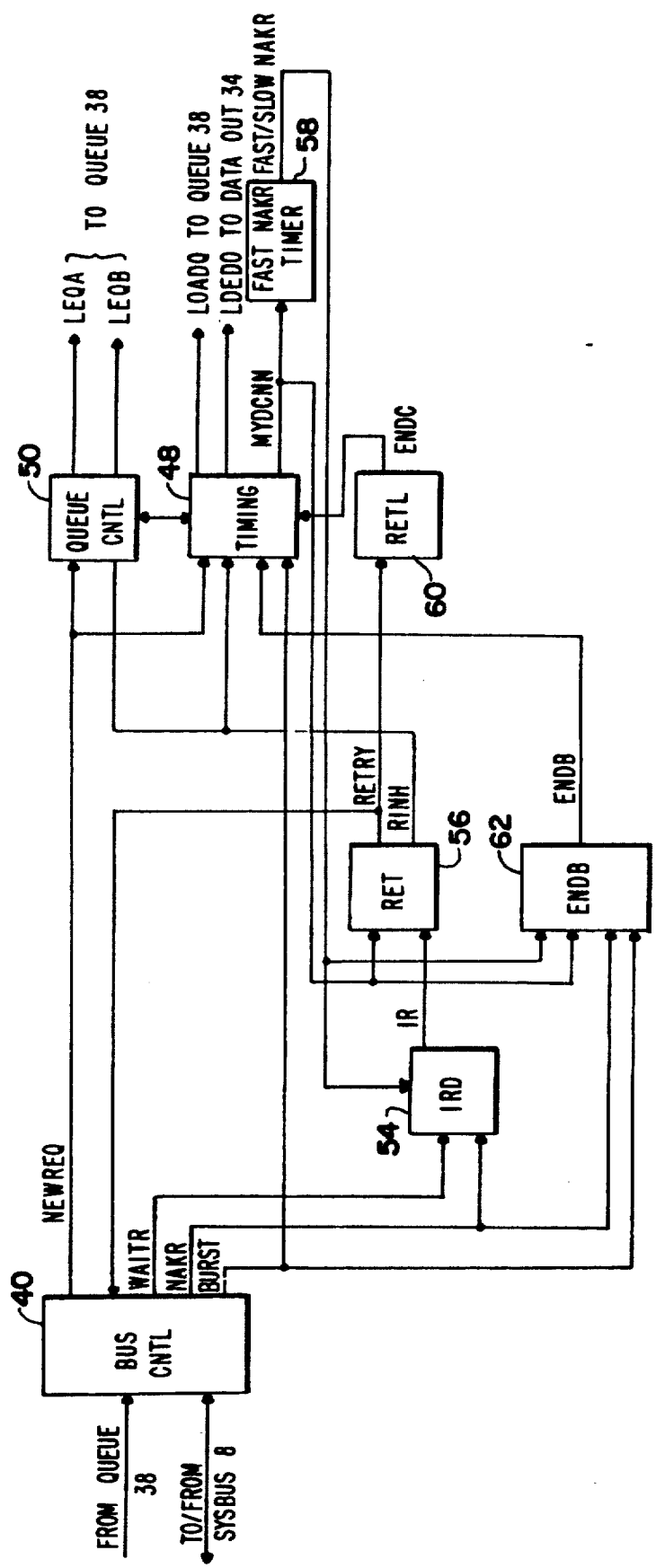

Referring now to FIG. 3, therein is shown a functional diagram illustrating the memory retry logic and operations performed by MEMCNTL 26 according to the present invention. Certain elements of MEMCNTL 26 which have been previously discussed, in particular BUS CNTL 40, TIMING 48 and QUEUE CNTL 50 are represented in FIG. 3, together with certain signals pertinent to the operation of the present invention. Also represented in FIG. 3 are other logic elements representing the functions performed according to the present invention.

As was previously described, BUS CNTL 40 is connected from both QUEUE 38 to receive memory operation command bits from memory requests received into QUEUE 38 and to SYSBUS 8 to receive and provide bus control signals as described in Appendix A. The transmittal of a new request for a memory operation to Main Memory 12 through SYSBUS 8 will detected by BUS CNTL 40 through the data, address, control and handshake signals received from SYSBUS 8. BUS CNTL 40 will in turn generate a signal indicating the presence of the new memory operation request on SYSBUS 8, represented as New Memory Request (NEWREQ), to the other elements of MEMCNTL 26, in particular to QUEUE CNTL 50 and TIMING 48.

As was described, QUEUE CNTL 50 tracks the execution of any requests present in QUEUE 38 and selects between QUEUE A 38 and QUEUE B 38 to receive any new requests appearing on SYSBUS 8, with any new request being loaded into whichever of QUEUE A 38 and QUEUE B 38 is free to receive a new request. This function is represented in FIG. 3 by the two queue select signals provided to QUEUE 38 by QUEUE CNTL 50, respectively designated as Load Enable Queue A (LEQA) to QUEUE A 38 and Load Enable Queue B (LEQB) to QUEUE B 38. The actual loading of the new request into QUEUE 38 is controlled by a Load Queue (LOADQ) command generated by TIMING 48; that is, QUEUE CNTL 50 selects which of QUEUE A38 or QUEUE B 38 is to receive the new request while TIMING 48 controls the actual transfer of the request into the queue.

As was also described, TIMING 48 controls the loading of data words from MEMBLOCKs 28 to DATAOUT A 34 and DATAOUT B 34; as was described, data words read from MEMBLOCKs 28 are latched into DATAOUT A 34 and DATAOUT B 3 before being transferred through EDAC 32 and DATA MUX 36 to SYSBUS 8 and PBUS 13. The control of DATA OUT 34 by TIMING 48 is indicated by the Load Enable Data Output (LDEO) provided to DATA OUT 34 by TIMING 48.

Referring now to the memory retry logic and operations of the present invention, BUS CNTL 40 provides a number of signals which represent both the type of memory operation requested and the state of operation of the SYSBUS 8 and PBUS 13. Among these signals are WAIT Response (WAIT), Negative Acknowledge Response (NAKR), and Burst Request (BURST).

The first two of these signals, WAIT and NAKR, are related to bus operations. The general structure and operation of a system bus such as SYSBUS 8 are well known and understood by those of ordinary skill in the art and are well described, for example, in the previously referenced patents, such as U.S. Pat. No. 4,764,862 for a Resilient Bus System. As such, the operations of SYSBUS 8 and PBUS 13 will not be discussed in detail and only the bus signals and operations pertinent to the present invention will be considered.

In this regard, it is relevant to the present invention to understand that each bus operation, such as the read of a single word from memory or a write of a single word to memory, is executed within a single bus cycle, and that a burst operation is a sequence of individual bus operations with a single data word being transferred in each operation that is completed.

A bus operation is comprised of two operations, which are executed concurrently. One is the assertion of the bus request and the response to the bus request and the second is the actual tranfer of the data if the request was accepted by the recipient.

In the first operation BUS CNTL 40 interacts with the bus control logic of the system element which has previously transmitted a request for a memory operation, through a previous bus transfer, to initiate a bus transfer operation by placing certain command and handshake signals on SYSBUS 8. The system element which had requested the memory operation presently being executed may respond to the request for a bus operation by accepting the operation, asserting an Acknowledgement response (ACKR) signal, together with other handshake signals, or may make a response refusing the bus transfer, for example, by issuing a wait (WAIT) response, by issuing a Negative Acknowledge (NAKR) signal, or by not responding at all, which results in a NAKR signal.

At the same time as the bus request is asserted, the system element requesting the bus operation, such as the memory, places the requested data word on the data lines of the bus and, if the recipient accepts the bus request, the recipient also accepts the data at the same time the request is accepted.

Of the possible responses to a bus request, WAIT indicates that Main Memory 12 has attempted to complete a requested memory operation, for example, a memory read, by transferring the data to the requesting element through SYSBUS 8 and has received a WAIT response from the requesting element.

NAKR indicates that while the memory has requested a bus transfer with the element requesting the memory operation, the requesting element has not Acknowledged the bus request, that is, has not responded to the bus request. NAKR will generally occur through expiration of a timeout period. That is, the memory will assert the bus request, which will be detected by SMF 20 which will in turn will start a timer running. If the element with which the bus operation was requested does not respond to the request before expiration of the time-out timer, a NAKR, referred to as a "slow NAK", will will be asserted by SMF 20.

NAKR may also be asserted by the receiving element during a memory burst operation. As was described above and as is described in the referenced U.S. Pat. No. 4,366,539 for Memory Controllers With Burst Mode Capability, the element requesting a burst read from memory may elect to receive less than the full number of data words transmitted in the burst by asserting NAKR after the selected number of data words have been received. The memory will respond to this during-transmission NAKR, called a "fast NAK", by terminating the then current bus operation and proceeding to the next requested memory operation. In the event of a fast NAKR response to a non-burst transfer, however, the memory will ignore the fast NAKR response and wait for a slow NAKR from SMF 20.

Finally, BURST is derived from the bus command signals specifying the type of memory operation that has been requested. In particular, one combination of control bits, the Double Pull (BSDBPL) and Double Word (BSDBWD) control lines, is used to indicate that multiple word read of memory, that is, a burst, has been requested. The particular combination of BSDBPL and BSDBWD bits indicates whether the request has been for a burst operation through SYSBUS 8.

TIMING 48 also provides certain signals which are particularly pertinent to the present invention, such as My Data Cycle Now (MYDCNN). TIMING 48 asserts MYDCNN when the memory takes control of the bus and begins the bus operation, putting the data on the bus together with the bus operation request signals when MYCDDN is assert.

As was described, the present invention provides improved resilience for memory operations, in particular memory read operations, wherein the memory receives an improper or illegal response from the element requesting the memory operation. The present invention allows the memory to retry the transmission of the requested data to the requesting element at the next available bus cycle, rather than cancelling the requested read operation and requiring the requesting element to re-submit the request. A fast NAKR response asserted by the requesting element during a system bus burst transmission will, however, result in termination of the burst operation.

Referring to FIG. 3, the retry logic of the present invention includes an Improper Response Detector (IRD) 54 connected from the NAKR and WAIT outputs of BUS CNTL 40 to detect when the memory receives a WAIT or NAKR response from the requesting element when attempting to initiate a bus transfer operation, that is, to transmit data to the requesting element, or a NAKR response due to the requesting element not responding to the memory request for a bus transfer operation within the time-out period for response. If such a response is detected by IRD 54, IRD 54 asserts an Improper Response (IR) output to Retry Logic (RET) 56.

The other inputs to RET 56 include the MYDCNN output of TIMING 48, which determines the periods of memory operation in which an improper response will result in a retry of the memory transmission.

The condition wherein the memory has asserted a request for a memory operation and has received an improper response, such as WAIT or "slow NAK", should result in a suspension of the memory read operation and a retry of the operation at the next available bus cycle. This condition is detected by RET 56 which, as described and shown, receives the asserted IR signal from IRD 54 and the asserted form of the MYDCNN signal from TIMING 48 and asserts a RETRY signal when this condition exists.

In this regard, it was stated that MYDCNN is asserted when the memory gains control of the bus and asserts the bus request. If the recipient of the request refuses the request, it will assert a fast NAKR within a predetermined interval that is shorter than the interval before SMF 20 will assert a slow NAKR. As indicated in FIG. 3, the MYDCNN output of TIMING 48 is used to trigger a timing gate generator, FAST NAKR TIMER 58, whose output is a gate signal used to differential between a FAST NAKR response and a slow NAKR. The output of FAST NAKR TIMER 58, FAST/SLOW NAKR is provided to IRD 54 and gates IRD 54 so that IRD 54 asserts signal IR only on an unacceptable response, that is, any WAIT response, any Fast NAKR response to a non-burst operation, and any slow NAKR response.

RETRY is provided to BUS CNTL 40, to instruct BUS CNTL 40 to re-attempt the memory read operation at the next available bus cycle, and to Retry Latch (RETL) 60, which latches the occurrence of the retry command. RETL 60 latches the occurrence of a first RETRY command on a given memory read operation and, upon the occurrence of as second RETRY command for the same operation, will assert an End Cycle (ENDC) command to TIMING 48 terminate the operation if the retry attempt fails. RETL 58 thereby inhibits the generation of a second retry attempt on a given operation, so that a given operation may be retried only once.

RET 56 generates a second signal, Retry Inhibit (RETH), with the RETRY signal. RETH is provided to QUEUE CNTL 50 to inhibit QUEUE CNTL 50 from selecting the next requested operation in QUEUE 38, thereby preserving the present request for the retry. RETH is also provided to TIMING 48 to inhibit LOADQ to prevent another request from being loaded into QUEUE 38 and the loss of the present request or a pending request already in QUEUE 38. RETH also inhibits LDEDO, to that the data read from MEMBLOCKs 28 and into DATA OUT 34 is held in DATA OUT 34 for the retry attempt.

Finally, NAKR, BURST, MYDCNN and FAST/SLOW NAKR are provided as inputs to End Burst logic (ENDB) 62. As was described, the occurrence of a "fast NAKR" during the a burst read of data from Main Memory serves to terminate the burst, thereby allowing the element requesting the burst read to elect to receive only the desired number of words, rather than all of the words normally transmitted in a burst read. The BURST and NAKR inputs to ENDB 62 of course indicate that the current operation is a burst read and that a NAKR has occurred. The asserted form of the MYDCNN signal indicates that the memory is performing a memory operation. FAST/SLOW NAKR is used to determine that the NAKR was a fast NAKR, rather than a slow NAKR, and should thereby terminate the burst operation.

ENDB 62 will thereby detect the occurrence of a fast NAKR during any bus operation of a burst read operation and will assert an End Cycle (ENDC), which in turn is provided to TIMING 48 to terminate the memory operation. TIMING 48 will respond by terminating the operation and proceeding to the next memory request, rather than retrying the present operation.

It should be noted that a fast NAKR is the only unacceptable response that will terminate a memory burst read when asserted in response to one of the bus operations comprising the burst read. Any other unacceptable response to a request for a bus operation that is a part of a burst read, that is, a WAIT or a slow NAKR, will result in that bus operation being retried. It is therefore possible for each individual bus operation of a burst read to be retried without terminating the burst operation, unless one of the bus operation requests results in a fast NAKR.

In summary, therefore, the memory retry logic of the present invention improves the resilience of system memory operations with respect to system errors or faults which prevent a memory read operation from being completed on a first attempt by allowing the memory to retry the operation once. The memory logic of the present invention detects the occurrence of an improper response from the system element requesting a memory read operation when attempting to initiate the system bus operation for reading the data from memory to the requesting element and, if an improper response indicating that the requesting element is not accepting the bus operation request is detected, stores the memory operation request and the requested data and retries the data transmission on the next available bus cycle. If the memory receives an improper response of a specific type, that is, a fast NAKR, during a memory burst request, the memory will terminate the operation and proceed to the next requested operation. While the invention has been particularly shown and described with reference to a preferred embodiment of the method thereof, it will be understood by those of ordinary skill in the art that various changes in form, details and implementation may be made therein without departing from the spirit and scope of the invention as defined by the appended claims.

While the invention has been particularly shown and described with reference to a preferred embodiment of the method thereof, it will be understood by those of ordinary skill in the art that various changes in form, details and implementation may be made therein without departing form the spirit and scope of the invention as defined by the appended claims.

Appendix A

| MEMORY SUBSYSTEM INTERFACE LINES | |
|---|---|
| Designation | Description |
| | Address Lines |
| BSAD00-BSAD23 | The bus address lines constitute a twenty-four bit wide path used in conjunction with the bus memory reference line BSMREF to transfer a 24-bit address to controller 200 or a 16-bit identifier from controller 200 to the bus (for receipt by a slave unit). When used for memory addressing, the signals applied to lines BSAD00-BSAD03 select a particular 512K word module, the signals applied to lines BSAD04-BSAD22 select one of the 512K words in the module while the signal applied to line BSAD23 selects one of the bytes within the selected word (i.e., BSAD23 = 1 = right byte; BSAD23 = 0 = left byte). When used for identification, lines BSAD00-BSAD07 are not used. The lines BSAD08-BSAD23 carry the identification of the receiving unit as transmitted to controller 200 during the previous memory read request. |
| BSAP0 | The bus address parity line is a bidirectional line which provides an odd parity signal for the address signals applied to lines BSAD00-BSAD07 |
| | Data Lines |
| BSDT00-BSDT15, BSDT16-BSDT31 | The sets of bus data lines constitute a 32-bit or two word wide bidirectional path used for transferring data or identification information between controller 200 and the bus as a function of the cycle of operation being performed. During a write cycle of operation, the bus data lines transfer information to be written into memory at the location specified by the address signals applied to lines BSAD00-BSAD23. During the first half of a read cycle of operation, the data lines BSDT00-BSDT15 transfer identification information (channel number) to the controller 200. During the second half of the read cycle, the data lines transfer the information read from memory. |
| BSDP00, BSDP08, BSDP16, BSDP24 | The bus data parity lines are two sets of bidirectional lines which provide odd parity signals coded as follows: BSDP00 = odd parity for signals applied to lines BSDT00-BSDT07 (left byte); BSDP08 = odd parity for signals applied to lines BSDT08-BSDT15 (right byte); BSDP16 = odd parity for signals applied to lines BSDT16-BSDT23; and BSDP24 = odd parity signals applied to lines BSDT24-BSDT31. |
| | Control Lines |
| BSMREF | The bus memory reference line extends from the bus to the memory controller 200. When set to a true state, this line signals the controller 200 that the lines BSAD00-BSAD23 contain a complete memory controller address and that it is performing a write or read operation upon the specified location. When reset to a false state, the line signals controller 200 that the lines BSAD00-BSAD23 contain information directed to another unit and not controller 200. |
| BSWRIT | The bus write line extends from the bus to the memory controller 200. This line when set to a true state, in conjunction with line BSMREF being true, signals controller 200 to perform a write cycle of operation. When reset to a false state, this line, in conjunction with line BSMREF being true, signals controller 200 to perform a read cycle of operation. |
| BSBYTE | The bus byte line extends from the bus to controller 200. This line, when set to a true state, signals controller 200 that it is to perform a byte operation rather than a word operation. |
| BSLOCK | The bus lock line extends from the bus to controller 200. When set to a true state, this line signals controller 200 of a request to perform a test or change the status of a memory lock flip-flop included within the controller 200. |
| BSSHBC | The bus second half bus cycle line is used to signal a unit that the current information applied to the bus by controller 200 is the information requested by a previous read request. In this case, both controller 200 and the unit receiving the information are busy to all units from the start of the initiation cycle until controller 200 completes the transfer. This line is used in conjunction with the BSLOCK line to set or reset its memory lock flip-flop. When a unit is requesting to read or write and line BSLOCK is true, the line BSSHBC, when true, signals controller 200 to reset its lock flip-flop. When in a false state, it signals controller 200 to test and set its lock flip-flop. |

MEMORY SUBSYSTEM INTERFACE LINES -continued

| Designation | Description |
|---|---|
| BSMCLR | The bus master clear line extends from the bus to controller 200. When this line is set to a true state, it causes the controller 200 to clear to zeros certain bus circuits within controller 200. |
| BSDBWD | The double word line is a unidirectional line which extends from the controller 200 to bus 10. This line together with the BSDBPL line is used during read requests to indicate how many words of data and in what format are being provided by memory controller 200. During read response cycles from memory controller 200, the state of line BSDBWD indicates whether one or two words of data are being applied to bus 10. When line BSDBWD is forced to a binary ONE state, this indicates that two words are being transferred. When only one word is being transferred, line BSDBWD is forced to a binary ZERO. |
| BSDBPL | The double pull line is a bidirectional line which extends between controller 200 and bus 10. This line together with line BSDBWD indicates whether the response is the first (not the last) or the last unit of data requested. |

Bus Handshake/Timing Lines

| Designation | Description |
|---|---|
| BSREQT | The bus request line is a bidirectional line which extends between the bus and controller 200. When set to a true state, it signals the controller 200 that another unit is requesting a bus cycle. When reset to a false state, it signals controller 200 that there is no bus pending bus request. This line is forced to a true state by controller 200 to request a read second half bus cycle. |
| BSDCNN | The data cycle line is a bidirectional line which extends between the bus and controller 200. When forced to a true state, the line signals the controller 200 that a unit was granted a requested bus cycle and placed information on the bus for another unit. The controller 200 forces the line to a true state to signal that it is transmitting requested data back to a unit. Prior to this, controller 200 had requested and been granted a bus cycle. |
| BSACKR | The bus acknowledge line is a bidirectional line which extends between the bus and controller 200. When set to a binary ONE by controller 200, the line signals that it is accepting a bus transfer during a read first half bus cycle or write cycle. During a read second half bus cycle, the line is set to a binary ONE by the unit which originated the request signals the controller 200 of its acceptance of a transfer. |
| BSWAIT | The bus wait line is a bidirectional line which extends between the bus and controller 200. When set to a true or binary ONE state by controller 200, it signals a requesting unit that the controller cannot accept a transfer at this time. Thereafter, the unit will initiate successive retries until the controller 200 acknowledges the transfer. The controller 200 sets the BSWAIT line true under the following conditions: |

1. It is busy when all queue registers are full.
2. It is busy when placed in an initialize mode.

When the BSWAIT line is set to a true or binary ONE state by a unit, this signals the controller 200 that the data is not being accepted by the requesting unit and to terminate its present bus cycle of operation.

| Designation | Description |
|---|---|
| BSNAKR | The bus negative acknowledge line is a bidirectional line which extends between the bus and controller 200. When this line is set to a true or binary ONE state by controller 200, it signals that is refusing a specified transfer. The controller 200 sets line BSNAKR to a true state as follows: |

1. Memory lock flip-flop is set to a binary ONE, and
2. The request is to test and set the lock flip-flop (BSLOCK true and BSSHBC false)

In all other cases, when the memory lock flip-flop is set, controller 200 generates a response via the BSACKR line or the BSWAIT line or generates no response.

When the BSNAKR line is forced true by a unit, this signals controller 200 that the data is not accepted by the unit and to terminate its cycle of operation.

Tie Breaking Control Lines

| Designation | Description |
|---|---|
| BSAUOK-BSIUOK | The tie breaking network lines extend from the bus to controller 200. These lines signal controller 200 whether units of higher priority have made bus requests. When all the signals on these lines are binary ONES, this signals controller 200 that it has been granted a bus cycle at which time it is able to force the BSDCNN line to a binary ONE. When any one of the signals on the lines is a binary ZERO, this signals controller 200 that it has not been granted a bus cycle and is inhibited from forcing line BSDCNN to a binary ONE. |
| BSMYOK | The tie breaking network line extends from controller 200 to the bus. Controller 200 forces this line to a false or binary ZERO state to signal other units of lower priority of a bus request. |
| BSYELO | The bus yellow line is a bidirectional line. When set to a true state during the second half of a bus cycle in response to a read command, it indicates that the accompanied transferred information has been successfully corrected. When set to a true state during a memory read request, this line indicates that the read request is to be interpreted as a diagnostic command. |

What is claimed is:

1. In a data processing system having a memory for storing and providing data, system elements for operating on the data, and a system bus connected between the memory and the system elements, each bus transfer including a request for a bus transfer operation and a response to a bus transfer operation and either a request for memory data or the requested data, each system element including a means for generating requests for data form the memory, the memory including a memory control means including a bus control means connected to the system bus for generating and providing on the system bus requests for bus transfers and for responding to requests provided on the system bus by system elements for bus transfers, the memory including a memory operation retry means, comprising:

memory timing means connected from the bus control means and responsive to a memory request on the system bus for generating a bus transfer signal for indicating the occurrence of a request for a bus transfer of memory data to a system element requesting memory data, the bus control means connected from the system bus and responsive to the system element responses on the system bus to memory requests for bus transfers for asserting an improper response signal when the memory bus control means has received an improper response to a memory request for a bus transfer, and retry means connected from the memory timing means and the memory bus control means and responsive to the improper response signal and to the bus transfer signal when the memory has asserted a request for a bus transfer of the memory data for generating a retry signal, wherein the memory control means is connected form the retry means and is responsive to the retry signal to latch the present memory request and the corresponding requested data in the memory, and to attempt to retry to transmit the requested data to the requesting system element.

2. The memory operation retry means of claim 1, further comprising:

retry latch means connected from the retry means to store the retry signal, and wherein the retry means is responsive to the occurrence of a second occurrence of the retry signal during the attempt to retry to transmit the requested data for asserting an end cycle signal, the memory control means is connected from the retry means and responsive to the end cycle signal for terminating the memory operation.

3. The memory operation retry means of claim 1, wherein the requests for data asserted by the system elements includes requests for bursts of a fixed number of words of memory data, further comprising:

in the bus control means, a means for generating a burst signal indicating that a present request for memory data is a request for a burst operation, and in the memory timing means, means connected from the burst signal output of the bus control means and responsive to the burst signal for indicating the transmission of data in response to a burst request, and burst termination means connected from the bus control means and the timing means and responsive to a request for a bus transfer operation by the memory, to the burst signal and to an improper response signal during a burst transmission for asserting an end burst signal, wherein the memory control means is responsive to the end burst signal to terminate the memory burst operation.

4. In a data processing system having a memory for storing and providing data, system elements for operating on the data, and a system bus connected between the memory and the system elements for performing bus transfers between the memory and the system elements, each bus transfer including a request for a bus transfer operation and a response to a bus transfer operation and either a request for memory data or the requested data, each system element including memory control means being responsive to the data requests for providing the requested data, and each system element and the memory control means including a bus control means for asserting requests for bus transfers and responding to requests for bus transfers, a method for improving the resiliency of the memory to improper responses from system elements, comprising the steps of:

in a memory timing means connected form the memory bus control means and responsive to a bus operation request provided on this system bus for a transfer memory data to a system element, generating a bus request signal indicating the occurrence of a request for a bus transfer of memory data to a system element requesting memory data, in the bus control means connected from the system bus and responsive to the system element responses to memory requests for bus transfers, generating an improper response signal when the memory bus control means has received an improper response to a memory request for a bus transfer, and in a retry means connected from the memory timing means and the memory bus control means and responsive at the bus request signal and the improper response signal, generating a memory retry signal in responsive to the improper response signal when the memory has asserted a request for a bus transfer of the memory data, and in the memory control means connected from the retry means and responsive to the retry signal, latching the present memory request and the corresponding requested data in the memory, and attempting to retry to transmit the requested data to the requesting system element.

5. The memory operation resiliency method of claim 4, further comprising the steps of:

in a retry latch means connected from the retry means and responsive to the retry signal, storing the retry signal, and responsive to the occurrence of a second generation of the retry signal during the attempt to retry to transmit the requested data, asserting an end cycle signal, and in the memory control means connected from the end cycle signal output of the retry means and responsive to the end cycle signal, terminating the memory operation.

6. The memory operation resiliency method of claim 4, wherein the requests for data generated by the system elements includes requests for bursts of a fixed number of words of memory data, further comprising the steps of:

in the bus control means and responsive to requests for bursts of memory data, generating a burst signal indicating that the present request for memory data is a request for a burst operation, and in the memory timing means connected from the burst signal output of the bus control means, generating a burst transmission signal indicating the transmission of data in response to a burst request, and in a burst termination means connected from the bus control means and the timing means and responsive to the improper response signal and the burst transmission signal during a burst transmission, asserting an end burst signal, and in the memory control means connected from the end burst signal output of the burst termination means and responsive to the end burst signal, terminating the memory burst operation.

7. In a data processing system having a memory for storing and providing data, system elements for operating on the data, and a system bus connected between the memory and the system elements for bus transfers between the memory and the system elements, each bus transfer including a request for a bus transfer operation and a response to a bus transfer operation and either a request for memory data or the requested data, each system element including a system element control means for generating requests for data from the memory, the memory including a memory control means connected from the system bus and responsive to the data requests for providing the requested data, and each system element and the memory control means including a bus control means connected to the system bus and respectively to the system element control means and to the memory control means for generating requests for bus transfers and responding to requests for bus transfers, a method for improving the resiliency of the memory to improper responses from the system elements, comprising the steps of:

in a memory timing means connected from the memory bus control means and responsive to a bus request on the system bus, generating a bus transfer signal having a first state indicating that the memory is transmitting the requested data and a second state indicating that the memory is not transmitting the requested data, in the bus control means and responsive to the system element responses to memory requests for bus transfers, generating an improper response signal when the memory bus control means has received an improper response to a memory request for a bus transfer, and in a retry means connected form the memory timing means and the memory bus control means and responsive to the improper response signal and to the bus transfer signal when the timing signal is asserted in the second state, generating a retry signal, and in the memory control means and connected from the retry signal output of the retry means and responsive to the retry signal, latching the present memory request and the corresponding requested data in the memory, and attempting to retry to transmit the requested data to the requesting system element.

8. The memory operation resiliency method of claim 7, further in a retry latch means connected from the retry signal output of the retry means and responsive to the retry signal, storing the retry signal, and responsive to the occurrence of a second generation of the retry signal during the attempt to retry to transmit the requested data, generating an end cycle signal, and in the memory control means and connected form the end cycle signal output of the retry latch means and responsive to the end cycle signal, terminating the memory operation.

9. The memory operation resiliency means of claim 7, wherein the requests for data asserted by the system elements include requests for bursts a fixed number of words of memory data, further comprising the steps of:

in the bus control means and responsive to a request for a burst operation, generating a burst signal indicating that a present request for memory data is a request for a burst operation, and in a burst termination means connected from the improper response output and the bust signal output of the bus control means and responsive to the improper response signal when the burst signal and the second timing signal is asserted in the first state, generating an end burst signal, and in the memory control means and connected form the end burst signal output of the burst termination means and responsive to the end burst signal, terminating the memory burst operation.

* * * * *